US 12,158,238 B2

(12) United States Patent
Sonnen et al.

(10) Patent No.: US 12,158,238 B2
(45) Date of Patent: Dec. 3, 2024

(54) PRESSURE VESSEL

(71) Applicant: NPROXX B.V., RK Heerlen (NL)

(72) Inventors: Michael Sonnen, Duisburg (DE); Frank Otremba, Stolberg (DE)

(73) Assignee: NPROXX B.V., RK Heerlen (NL)

( * ) Notice: Subject to any disclaimer, the term of this patent is extended or adjusted under 35 U.S.C. 154(b) by 186 days.

(21) Appl. No.: 17/638,180

(22) PCT Filed: Aug. 27, 2020

(86) PCT No.: PCT/EP2020/073979
§ 371 (c)(1),
(2) Date: Feb. 24, 2022

(87) PCT Pub. No.: WO2021/037983
PCT Pub. Date: Mar. 4, 2021

(65) Prior Publication Data
US 2022/0325851 A1    Oct. 13, 2022

(30) Foreign Application Priority Data
Aug. 30, 2019    (EP) ..................................... 19194565

(51) Int. Cl.
*F17C 1/06* (2006.01)
*F17C 1/16* (2006.01)
(52) U.S. Cl.
CPC .................. *F17C 1/06* (2013.01); *F17C 1/16* (2013.01); *F17C 2201/0109* (2013.01);
(Continued)
(58) Field of Classification Search
CPC ...... F17C 1/06; F17C 1/16; F17C 2201/0109; F17C 2203/011; F17C 2203/0604;
(Continued)

(56) References Cited

U.S. PATENT DOCUMENTS 5,758,796 A * 6/1998 Nishimura ................ F17C 1/06
220/651
2010/0163565 A1* 7/2010 Matsuoka ............... F17C 13/06
220/581
(Continued)

FOREIGN PATENT DOCUMENTS

| DE | 474125 C | 3/1929 |
|---|---|---|
| DE | 102011105627 A1 | 1/2012 |
| FR | 1554072 A | 1/1969 |

OTHER PUBLICATIONS

International Search Report and Written Opinion for corresponding patent application No. PCT/EP2020/073979 dated Nov. 11, 2020.

*Primary Examiner* — Nathan J Jenness
*Assistant Examiner* — Laura E. Parker
(74) *Attorney, Agent, or Firm* — Tarolli, Sundheim, Covell & Tummino LLP

(57) ABSTRACT

The invention relates to a hybrid pressure vessel with a fiber-composite component and a metallic component. Furthermore, the invention relates to a manufacturing method for such a hybrid pressure vessel. The hybrid pressure vessel according to the invention has a liner having an inner face and an outer face, with an outer diameter DL, and a metallic boss with an outer diameter DB, the metallic boss being adapted to accommodate a valve, the hybrid pressure vessel having a storage volume on the inside, the liner being pipe-shaped and the outer diameter DB of the boss being at least as large as the outer diameter DL of the liner.

5 Claims, 4 Drawing Sheets

(52) U.S. Cl.
CPC ............... *F17C 2201/0138* (2013.01); *F17C 2203/0604* (2013.01); *F17C 2203/067* (2013.01); *F17C 2205/0305* (2013.01); *F17C 2209/2154* (2013.01); *F17C 2223/0123* (2013.01)

(58) Field of Classification Search
CPC ........ F17C 2203/0619; F17C 2203/066; F17C 2203/0663; F17C 2203/0685; F17C 2205/0394; F17C 2221/012; F17C 2223/0123; F17C 2270/0168; F17C 13/04; F17C 2205/0305; F17C 2205/0323; F17C 2360/036
USPC .................................................. 220/581, 589
See application file for complete search history.

(56) References Cited

U.S. PATENT DOCUMENTS

| | | | | |
|---|---|---|---|---|
| 2012/0000916 | A1* | 1/2012 | Kleber | F16J 12/00 156/172 |
| 2015/0362130 | A1* | 12/2015 | Lanzl | H01M 8/04104 429/446 |
| 2016/0348839 | A1* | 12/2016 | Saferna | B29C 65/64 |
| 2017/0122437 | A1* | 5/2017 | Metzbower | F17C 1/16 |
| 2017/0276294 | A1* | 9/2017 | Almagro | F17C 1/06 |

* cited by examiner

PRESSURE VESSEL

RELATED APPLICATIONS

The present invention is a U.S. National Stage under 35 USC 371 patent application, claiming priority to Serial No. PCT/EP2020/073979, filed on Aug. 27, 2020; which claims priority from European Patent Application No. 19194565.8 filed on Aug. 30, 2019; the entirety of both are hereby incorporated herein by reference.

FIELD OF THE INVENTION

The invention relates to a hybrid pressure vessel having a fiber composite component and a metallic component. The invention further relates to a method of manufacturing such a hybrid pressure vessel.

BACKGROUND OF THE INVENTION

The market for pressure vessels, in particular pressure vessels reinforced with fiber composite material (here and in the following abbreviated "FCM"), grows continually. Increasing production of natural gas and fracking gas makes storage in pressure vessels necessary, especially in countries with no respective pipeline network. In addition, the automotive industry which is heavily involved in the development of fuel cell vehicles requires that the fuel be stored in the form of gaseous hydrogen under high pressure in pressure vessels. Other types of vehicles using hydrogen may be railway vehicles, aircraft or watercraft. Even in spacecraft, application is conceivable. As regards the transport of the pressure vessels, it is desired that they should be lightweight pressure vessels because transporting heavy-weight pressure vessels is associated with the consumption of an unnecessarily high amount of energy, thus leading to excessively high transport costs.

Presently used cylindrical fibre-reinforced pressure vessels have a reinforcement layer consisting of FCM made of fibres embedded in a matrix material which is wound as an outer layer onto an inner vessel (called liner) of the pressure vessel, which acts as a winding core, by means of a winding method. Winding is the preferred process for a manufacturing of fiber composite layers which is efficient in terms of time and costs. While the inner vessel guarantees, for instance, gas-tightness of the pressure vessel, the reinforcement layer made of FCM provides the pressure vessel with the necessary mechanical stability. For pressure vessels of type 3, a metallic inner vessel (metallic liner) consisting e.g. of aluminum or steel is employed; in case of pressure vessels of type 4, the non-load-bearing inner vessel (liner) is made of plastic. The plastic liners are commonly produced by blow molding, rotomolding or welding of individual components. The most commonly used materials are, due to the specific manufacturing methods, thermoplasts, for instance polyamides, or polyethylenes, in particular high-density polyethylene.

A metallic boss serves the purpose of connecting a valve or of being the end portion of a type-4 vessel; in this case, it can be embodied as a closed boss. The outer diameter of the boss is much smaller than the outer diameter of the liner.

The pressure vessels must withstand a very high inner pressure. Currently, for instance, hydrogen tanks of automobiles are filled at a pressure of approximately 700 bar. Especially, the pressure vessels may not burst, even in case of a crash. Therefore, such pressure vessels are designed with a cylindrical central part closed on both sides by what are called "pole caps". An FCM is wound as a reinforcement layer over the cylindrical central part and the pole caps. The reinforcement layer can be manufactured, for instance, with the filament winding method, wherein the wrapping of the pressure vessels takes place in one single operation. In other words, the fibers are wound in one operation onto the plastic liner circumferentially or crosswise or in the form of helix layers.

The connection between the boss and the pressure vessel is of particular importance. The boss must be connected to the pressure vessel in a pressure-resistant manner, for it must withstand high interior pressures; the same applies to its connection with the pressure vessel. The boss must also be connected tightly to the pressure vessel. Hydrogen is a highly explosive gas with very small molecules; therefore, it is particularly important especially for the transport of hydrogen that the pressure vessel is completely tight, even with respect to hydrogen under high pressure.

From the German patent application DE 10 2016 221 978 A1, a hybrid component made of a hollow fiber composite component and at least one metallic force transmission component for transmitting forces via the force transmission component to the fiber composite component is known, the fiber composite component comprising a first and a second end along a provided main axis, with at least the first end being an open end. At least one first portion of the open end having an inner face facing the main axis and an opposite outer face extends along the main axis, the first portion tapering in the direction of the first end. The force transmission component comprises an accordingly formed inner core for resting on the inner face of the first portion and a metallic outer rim with an interior force transmission face adapted to the inner core and to the first portion for at least partially resting on the outer face of the first portion, inner core and outer rim being suitably adapted so that after the outer rim has been placed on the first portion, the inner core can be pulled by a traction connection through the first open end in the direction of the outer rim such that in this manner a suitable press fit of the outer rim on the FCM of the first portion can be produced in order to be able to transmit the forces via the force transmission component to the fiber composite component. However, the hybrid component is not suitable as a pressure vessel since it has no liner and no boss by means of which the hybrid component can be filled and evacuated.

From the French patent application FR 1 554 072 A, a hybrid pressure vessel is known having a liner with an inner face and an outer face with different outer diameters, depending on the translational site, and a metallic boss with an outer diameter, the metallic boss being adapted to accommodate a valve.

From US patent application U.S. 5 758 796 A, a pressure vessel is known comprising a lining with an end wall arrangement which is formed by combining two rigid end wall elements at a fixed mutual distance by means of a connecting element and an elastic circumferential wall plate fastened to the two end wall elements so as to enclose a space between them. The two end wall elements are formed from an aluminum alloy by an extrusion process. The connecting element is a pipe made of an aluminum alloy which is manufactured by an extrusion process and has a large number of connection holes in the pipe wall. The circumferential wall plate consists of aluminum foil and is cylindrical so as to enclose the space between the two end wall elements. A spiral reinforcement layer and a band reinforcement layer are provided around the lining, both consisting of glass fiber.

From the German patent application DE 10 2011 105 627 A1, an assembly method for a composite pressure vessel is known. An end portion of a pipe-shaped element is fitted into a circular slot formed in an end cap. A sealing means can be located in the circular slot. The end cap comprises an annular groove in an outer face of the end cap body portion. A first material layer is formed on an outer face of the pipe-shaped element. The first material layer comprises a first composite material with fibers oriented in the circumferential direction with respect to the pipe-shaped element. A second material layer is formed on the first material layer, with a portion of the second material layer being arranged into the annular groove, comprising a second composite material which comprises fibers oriented axially with respect to the pipe-shaped element. A third material layer is formed adjacent to the second material layer and inside the annular groove, comprising a third composite material with fibers which have an orientation in the circumferential direction with respect to the pipe-shaped element.

For reasons of installation geometry, it is desirable to have respective pressure vessels with small outer diameters. In pressure vessels with small outer diameters, the ratio between the outer diameter of the boss and that of the liner is much smaller or nearly equal. On the one hand, a valve must be accommodated, requiring a minimum outer diameter of the boss; on the other hand, manufacturing of a very long liner is not without drawbacks, especially in methods of mass production such as blow molding or rotomolding.

SUMMARY OF THE INVENTION

The object of the invention is to provide a hybrid pressure vessel with an outer diameter as small as possible and a liner outer diameter on the scale of the outer diameter of the boss, which meets the same requirements on bursting safety and tightness as known hybrid pressure vessels with larger outer diameters. Furthermore, it is an object of the invention to provide a manufacturing method for such a hybrid pressure vessel.

The first object is achieved by a hybrid pressure vessel having a liner with an inner face and an outer face, with an outer diameter DL and a metallic boss with an outer diameter DB, the metallic boss being adapted to receive a valve, the hybrid pressure vessel having a storage volume on the inside, the liner being pipe-shaped and the outer diameter DB of the boss being at least as large as the outer diameter DL of the liner.

The term "pressure vessel" comprises all types and shapes of pressure vessels which comprise an inner vessel, also called liner, for instance made of a thermoplastic material, which have been mechanically reinforced by a fiber composite material on the outside such that the pressure vessel meets the requirements made in terms of pressure resistance. In this disclosure, a hybrid pressure vessel is understood to be a pressure vessel consisting of different materials, in particular a plastic liner and a metallic boss. Known pressure vessels are cylindrical with convex terminals on both sides of the cylindrical central part. These terminals are called pole caps and are used for pressure-tight sealing of the central part. For reinforcement of the pressure vessel, an outer layer made of fiber composite material is wound around the outside of the inner vessel, potentially forming at the same time the outer face of the pressure vessel. The inner vessel can be produced by means of various techniques, for instance by welding, injection molding or as blow-molding. The pole caps can also be placed onto the central part after production, for instance by welding. The separate pole caps may be manufactured, for instance, by injection molding. Pressure vessels with a thermoplastic inner vessel have a very low weight, on the one hand, which is important e. g. for applications in means of transport; and on the other hand, content such as hydrogen, for example, can be stored under high pressure with low losses since suitable thermoplasts have a sufficiently low hydrogen permeability and the required rigidity is provided by the outer layer made of fiber composite material.

A hybrid pressure vessel is such a pressure vessel consisting of several different materials.

In general, a fiber composite material FCM for the fiber composite layer is composed of two main components, which are fibers herein, embedded in a matrix material which creates the strong bond between the fibers. The fiber composite material can be wound from one fiber or from a plurality of fibers, wherein the fiber(s) is/are wound closely next to and in contact with each other. The wound fibers are already impregnated with matrix material. This results in a fiber layer onto which additional fibers are wound in further fiber layers until the fiber composite material has the desired thickness and forms a corresponding fiber layer having this thickness. The outer layer is wound in several plies made of fiber composite material, where different plies may contain fibers arranged at different fiber angles with respect to the cylinder axis of the pressure vessel. In one embodiment, each of the fiber layers made of first and/or additional fibers, for instance second fibers, comprises a plurality of fiber plies. The composite gives the fiber composite material properties of higher quality, such as higher strength, than any of the two individual components involved could provide. The reinforcing effect of the fibers in the fiber direction is achieved when the modulus of elasticity of the fibers in the longitudinal direction is in excess of the modulus of elasticity of the matrix material, when the elongation at break of the matrix material is in excess of the elongation at break of the fibers or when the breaking resistance of the fibers is in excess of the breaking resistance of the matrix material. The fibers that can be used are fibers of any kind, for example glass fibers, carbon fibers, ceramic fibers, steel fibers, natural fibers, or synthetic fibers. The matrix materials used for the fiber composite layer are as a rule thermosets. The material properties of the fibers and the matrix materials are known to the person skilled in the art, with the result that the person skilled in the art can select a suitable combination of fibers and matrix materials for producing the fiber composite material for the particular application. Herein, individual fiber layers in the fiber composite region can comprise a single fiber or a plurality of equal or different fibers.

The term "thermoplast" designates plastics which can be thermoplastically deformed within a specific temperature range. This process is reversible, that is, it can be repeated for an indefinite number of times by cooling and reheating into the molten state, provided that no thermal decomposition of the material takes place due to overheating. This distinguishes thermoplasts from thermosets and elastomers. Another unique characteristic of thermoplasts is that they can be welded, in contrast to, for example, thermosets.

The term "pipe-shaped" here designates a shape which at least substantially corresponds to the shape of a substantially circular pipe, in particular that of a pipe with a substantially constant inner and outer diameter, respectively. In particular, a substantial feature of the pipe-shaped liner is that it can be cut to length from a pipe which is circular within the boundaries of the common manufacturing tolerances, independently of whether the diameters of the pipe will be modified again in parts or entirely in a subsequent manufacturing step.

A liner of a hybrid pressure vessel according to the invention has no pole caps which are known from the state of the art. In particular, the outer diameter of the hybrid pressure vessel according to the invention is determined by the boss which must have a certain minimum diameter due to the necessity of accommodating a valve. In particular, the liner outer diameter of the hybrid pressure vessel according to the invention is on the order of the outer diameter of the boss. In this manner, the hybrid pressure vessel according to the invention can also be installed in small mounting spaces e. g. of a vehicle. The liner is also very easy to manufacture since its shape is not really three-dimensional. The two-dimensional cross-section of the pipe-shaped liner is substantially circular, where its third dimension can be described by only one parameter, namely its length. Therefore, such a liner does not necessarily have to be manufactured with the methods commonly used for liner manufacturing in the state of the art, such as blow-molding, rotomolding or welding of individual components. Rather, more simple production methods, such as extrusion, pultrusion or spinning can be employed as well. By means of such methods, respective semi-finished products can also be manufactured very precisely and economically at large lengths, production of the pipe-shaped liner also being possible by simply cutting such semi-finished products to length.

With a large ratio of the outer diameter of the boss with respect to that of the liner, the reinforcement fibers necessary for reinforcing the vessel can be deposited in a well-defined manner in the circumferential direction until the outer diameter of the boss is reached. This is advantageous in terms of loads since the circumferential plies are optimally to be positioned on the inner face of the laminate. The transition between the liner and the outer contour of the boss can be harmonious and thus correspond to the load.

The liner is made of a plastic material which is at least partially plastically deformable under pressure, the hybrid pressure vessel additionally having at least one outer layer applied on the liner for the reinforcement thereof and a boss with a squeezing ring and counterpiece for receiving the valve and sealing the storage volume with respect to the liner, the liner comprising a cylindrical connection area with an outer face and an inner face for connecting the boss; the squeezing ring being positioned on one side of the connection area of the liner and the counterpiece on a different side of the connection area of the liner for generating a sealing pressure between squeezing ring, connection area of the liner and counterpiece; the counterpiece having on the side thereof oriented toward the connection area of the liner a suitably formed groove with a first edge facing the storage volume and a second edge in the opposite direction for receiving a sealing ring which seals under the sealing pressure; the groove and the sealing ring being dimensioned such and the liner material being provided to form under the sealing pressure, due to its plastic deformability, first and second sealing beads which protrude at least into both gaps between the sealing ring and the first and second edge, respectively.

The inner vessel is here composed of multiple parts, at least of the pipe-shaped liner and the bosses at the end faces of the pipe-shaped liner. At least one of the bosses is adapted to receive a valve for filling in or removing media, respectively, from the hybrid pressure vessel. The boss on the opposite side can be embodied as a closed boss.

The plastically deformable inner vessel material has the characteristic of being firm and stable in itself and at the same time having a certain fluidity so that it can be plastically deformed under high pressure at least at its surface and thus adapt to the contour of the pressing surfaces without producing large deformations. In addition, the inner vessel has the function of providing a gas-tight storage volume for storing filling gas in the pressure vessel, so that the inner vessel material should be gas-tight, for instance metal or plastic; in case of plastic, preferably PA or PE, as a single-layer or multi-layer system. The filling gas can be any gas, for instance hydrogen. In particular, because of the simple manufacturing methods, a material can be selected for the semi-finished liner product which is not suited for the methods well-known in the state of the art, such as blow-molding, rotomolding or welding. Such materials, for instance UHMW-PE (ultra-high molecular polyethylene) or PET, can for example also have better permeation characteristics and/or better temperature properties, in particular better low-temperature properties, as well as lesser water absorption than the materials commonly used for producing liners. The outer layer provides mechanical stability to the pressure vessel so that the functionalities of gas impermeability and pressure resistance are divided over the two components inner vessel and outer layer. The outer layer can be, for instance, a fiber composite layer wound or applied with other techniques on the inner vessel.

The sealing ring positioned in the groove does not completely fill the groove in the counterpiece but leaves gaps in the groove on both sides towards the inner face of the counterpiece, a first and a second gap which are used to provide redundancy of the sealing effect. The configuration of the components of the boss, in combination with suitable fluidity of the inner vessel material and the consequent formation of the sealing beads, ensures an improved sealing effect with simultaneous secure positioning of the components of the boss in the pressure vessel. In addition, the sealing ring remains stably in the groove even if the two sealing beads cause changes in pressure. This sealing concept provides a triple redundancy in sealing the storage volume: sealing in series (I) the first sealing bead of the bulge with respect to the counterpiece, (II) the squeezing ring via the connecting area of the liner toward the sealing ring and (III) the second sealing bead of the liner in the connecting area with respect to the boss, enormously improving reliability and permanence of the seal. By formation of the sealing beads due to the sealing pressure exerted by the boss, the boss is additionally self-sealing. The sealing concept is independent of the material of the squeezing ring and of the boss, with the materials of the same, however, having at least a lesser fluidity than the inner vessel material.

The specified pressure vessel has a very flexible structure due to the sealing concept according to the invention, so that customized bosses can easily be adapted by adequate configuration of the squeezing ring. Additionally, integration of an additional sleeve for integrating sensor systems, measurement sensors or other components protruding into the pressure vessel continues to be possible.

In another advantageous embodiment, the squeezing ring is is positioned on the inner face of the connecting area of the liner and the counterpiece is positioned on the outer face of the connecting area of the liner to generate a sealing pressure between squeezing ring, connection area of the liner and counterpiece.

The principle can also be reversed. In an alternative embodiment, the squeezing ring is positioned on the outer face of the connecting area of the liner and the counterpiece on the inner face of the connecting area of the liner to generate a sealing pressure between squeezing ring, connecting area of the liner and counterpiece. In this embodiment, however, the sealing concept which provides for the gas inside the pressure vessel to flow around the end face of the liner pipe, thus contributing to the sealing effect, is not applied.

In one embodiment, the squeezing ring is dimensioned such that the inner vessel material, due to its plastic deformability, forms a third bead around the squeezing ring on its bottom side directed towards the storage volume. In this manner, sliding of the squeezing ring towards the storage volume is prevented. In this way, the sealing pressure exerted on the sealing ring as originally set is maintained. Also, in case of impacts on the pressure vessel, the squeezing ring can no longer slide or fall into the storage volume.

In another embodiment, the squeezing ring or the counterpiece are formed such that between the storage volume and an upper end of the connecting area of the liner, there is an open gas connection to the storage volume. Thus, the pressure inside the storage volume is also present at the top of the connecting area of the liner.

In a further embodiment, the squeezing ring comprises an outer face facing the connecting area of the liner and an opposite inner face, the area of the outer face of the squeezing ring resting on the connecting area of the liner being smaller than its inner face. Due to the different area ratio between inner and outer face with an existing gas connection between storage volume and upper end of the connecting area of the liner, the sealing pressure is additionally increased by the pressure inside the storage volume of the pressure vessel and the squeezing ring is additionally pressed towards the counterpiece if the pressure rises in the storage volume (for instance if the storage volume is filled with the gas, e. g. up to 500 bar), further increasing the sealing effect and its reliability.

The groove can comprise a contour adapted to a shape of the sealing ring in the unstressed state. In this manner, no undefined cavities can form behind the sealing ring, further improving the sealing effect of the sealing ring.

The sealing ring can be an O-ring. O-rings have, on the one hand, reliable sealing properties and, on the other hand, suitable contours inside the groove are easiest to provide for this type of rings. The curvature of the groove is adapted to the curvature of the surface of the O-ring. The sealing ring, i. e. in this case, the O-ring, can be made of any material suitable for gas sealing.

The boss can comprise an additional safety element interconnecting the squeezing ring and the counterpiece. This prevents sliding of the squeezing ring in relation to the counterpiece, in particular towards the counterpiece.

The safety element can be supported in the counterpiece and comprise, at least on its side facing the squeezing ring, a thread provided for engaging the upper end of the squeezing ring. The safety element can be, for instance, a banjo bolt or a correspondingly shaped ring with passage openings for applying pressure on the upper end of the connecting area of the liner.

The counterpiece of the valve connection piece can comprise a connecting means for receiving the valve so as to be stable with respect to pressure. For instance, a valve can be screwed in a pressure-resistant manner into a respective thread as a connecting means of the counterpiece.

In another advantageous embodiment, the counterpiece has at least one additional suitably shaped groove for absorbing axial forces on its side facing the connecting area of the liner. In this manner, axial forces can be absorbed very easily since it is easy to form the counterpiece with the additional groove.

The liner can be made of a thermoplastic material. This is an obvious choice since thermoplasts can be easily and inexpensively processed to form a semi-finished pipe. The liner can consist, for instance, of HDPE, PA, UHMW-PE or PET.

Alternatively, the thermoplastic liner material can also be a fiber-reinforced thermoplast. In one embodiment, the reinforcement fibers can be carbon fibers.

Alternatively, the liner can be made of a thermosetting material, in particular a fiber-reinforced thermosetting material. The hybrid pressure vessel according to the invention has a pipe-shaped liner. Pipe-shaped liners or semi-finished liners consisting of thermosets are relatively easy to manufacture, for instance with the pultrusion method. In this manner, thermosetting liners can be produced inexpensively. They may also offer advantages in terms of stability and permeability.

The invention further relates to a method of manufacturing a hybrid pressure vessel according to the invention, the method comprising the following steps:
  providing a prefabricated pipe-shaped liner, placing the squeezing ring into the or on the connecting area of the liner,
  forming at least first and second sealing beads which under the sealing pressure, with the groove and the sealing ring dimensioned accordingly, protrude into both gaps between the sealing ring and the first or second edge, respectively, due to plastic deformability of the liner material, so as to seal the storage volume to be produced, manufacturing the outer layer on the liner, and positioning the valve (5) into the boss (4).

With the manufacturing method according to the invention, a hybrid pressure vessel can be efficiently manufactured, the outer diameter of the hybrid pressure vessel being determined by the boss. In particular, for the hybrid pressure vessel according to the invention, the liner outer diameter can be on the order of the outer diameter of the boss; in this manner, it can also be installed in small installation spaces, for instance of a vehicle. The shape of the liner is not really three-dimensional. The pipe-shaped liner has a substantially circular cross-section as a two-dimensional shape; its third dimension can only be described by one parameter, namely the length. Therefore, such a liner does not necessarily have to be produced with the methods commonly used for liner manufacturing in the state of the art, such as blow-molding, rotomolding or welding of individual components. Rather, simpler manufacturing methods, such as extrusion, pultrusion or spinning, present themselves as well. With such methods, respective semi-finished products can be manufactured very precisely and economically, also at large lengths, the pipe-shaped liner being produced from such semi-finished products by simple cutting to length.

In another advantageous embodiment, the method comprises the further step of forming a third bead around the squeezing ring on its bottom side facing the storage volume due to plastic deformability of the liner material.

In another advantageous embodiment, the outer layer has an inner ply and an outer ply, the outer ply being wrapped over the inner ply and the boss. By separation into different plies, each ply can be made of a different material. The outer ply is a fiber-composite ply.

In another advantageous embodiment, the prefabricated semi-finished pipe of the inner ply is a fiber-composite pipe covered with circumferential plies, the circumferential plies having an angle with respect to the longitudinal axis of the fiber-composite pipe which increases from the inside to the outside. The wrapping angles can, for instance, increase from 80° to 84° and then to 88°. In this manner, the load on the circumference package is made more homogeneous. This can be achieved, for instance, by a change in the roving number.

The inner ply can also be manufactured separately, for instance prefabricated as a pipe, which offers advantages in terms of straightness and roundness, in particular if the inner ply is also wrapped as a fiber-composite ply since it can be manufactured precisely on a metallic winding spindle.

The cylindrical semi-finished pipe can be extruded.

The cylindrical semi-finished pipe can also be pultruded or manufactured with the spinning method.

All these methods have proven to be efficient, depending on the material to be processed. The person skilled in the art knows the methods and can select one suitable for the material to be processed.

In another advantageous embodiment, the pipe-shaped liner is cut to length from a cylindrical semi-finished pipe. In other words, the semi-finished product is not the pipe-shaped liner but a longer pipe from which the pipe-shaped liner is cut to length. Manufacturing of the longer semi-finished product has advantages in terms of efficiency over individual shaping of the pipe-shaped liner.

In another advantageous embodiment, the outer ply is wrapped from an FCM, the outer ply being wrapped at wrapping angles between 30° and 90°, preferably between 35° and 90°, particularly preferably between 40° and 90°, with respect to the longitudinal axis of the liner. The ratio between the outer diameter of the liner, or vessel, respectively, and the neck of the boss results in wrapping angles in the second laminate package to be wrapped which do not require consolidation by means of additional circumferential plies. Since in this embodiment, the boss completely absorbs the inner pressure, the fibers of the second laminate package only need to absorb the axial forces of the boss produced by the inner pressure and not the radial forces produced in a type-4 vessel according to the state of the art.

In another advantageous embodiment, the connecting area of the pipe-shaped liner is constricted. The constriction can be performed, for instance, by temperature effects and can be cylindrical or conical. The constriction can lead to a little more wall thickness in the outer region of the boss for receiving the liner.

In another advantageous embodiment, the squeezing ring is brought into position by means of an installation device. In case of an interior squeezing ring, the ring can be positioned by the installation device, for instance, through the boss, facilitating installation.

In a further advantageous embodiment, the squeezing ring is subjected to temperature treatment before installation such that there is a large difference in temperature between the ring and the liner at the time of installation, due to this difference in temperature the squeezing ring being placed on the liner or inserted in the liner with play up to its desired position, in which it squeezes the liner by equalization of its temperature with the temperature of the liner. Placing the ring in its final position may take place, for instance, by positioning the hybrid pressure vessel vertically and lowering the squeezing ring into its final position by means of gravity. If magnetic materials are used for the squeezing ring, it is also possible, even if the squeezing ring is located on the inside, to bring it to its final position by using magnets on the outside. This also helps to facilitate installation.

The embodiments listed above can be used individually or in any combination to implement the devices according to the invention, even deviating from the mutual references in the claims.

SHORT DESCRIPTION OF FIGURES

These and other aspects of the invention are shown in detail in the figures as follows.

DETAILED DESCRIPTION OF EMBODIMENTS

Figure 1:
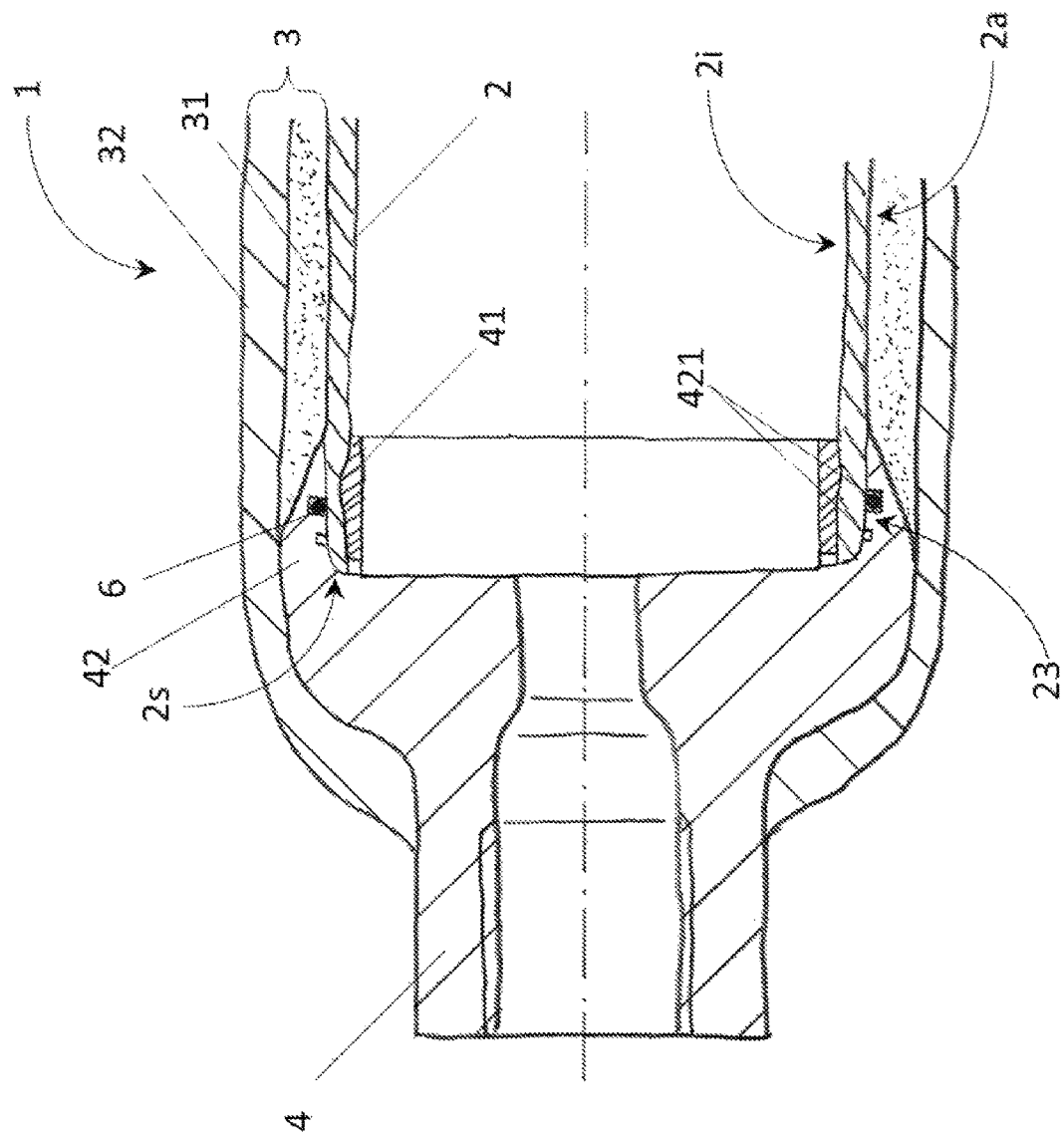
FIG. 1 shows a portion of a hybrid pressure vessel according to the invention in cross-section.

FIG. 1 shows a portion of a hybrid pressure vessel 1 according to the invention in cross-section. The pressure vessel has a pipe-shaped liner 2 covered by an inner ply 31 and an outer ply 32 of an outer layer 3. The inner ply 31 of the outer layer is also pipe-shaped. The end face of the inner ply 31 abuts at a counterpiece 42 of the boss 4 forming the terminal of the hybrid pressure vessel 1. The boss 4 is formed from a metal material. The outer ply 32 is wrapped over the inner ply 31 of the outer layer, this outer ply also partially covering the boss 4 so that the boss 4 is integrally connected to the pipe-shaped liner 2 and the inner ply 31 of the outer layer 3. The outer diameter of the hybrid pressure vessel 1 is determined by the outer diameter of the boss 4 which must have a certain minimum diameter because of the necessity of accommodating a valve 5 (not shown in the figure). In particular, the outer diameter of the liner 2 is on the order of the outer diameter of the boss 4. Because of the diameter ratio with an outer diameter of the boss 4 larger than the outer diameter of the liner 2, the reinforcement fibers of the inner ply 31 of the outer layer 3, if it is a fiber-composite pipe, necessary for reinforcing the vessel can be deposited in a well-defined manner until the outer diameter of the boss 4 is reached. This is advantageous in terms of load stresses since optimally, the circumferential plies are to be positioned on the inner face of the laminate. The transition between the liner 2 and the outer contour of the boss 4 can be harmonious and therefore load-conforming. On the inside, in the connecting area 23 of the liner 2, there is a squeezing ring 41 which squeezes the liner 2 against the counterpiece 42 of the boss 4 in its connecting area 23. There are at least two grooves 421 in the counterpiece 42. One of these grooves 421 contains a sealing ring 6 in the form of an O-ring.

Figure 2:
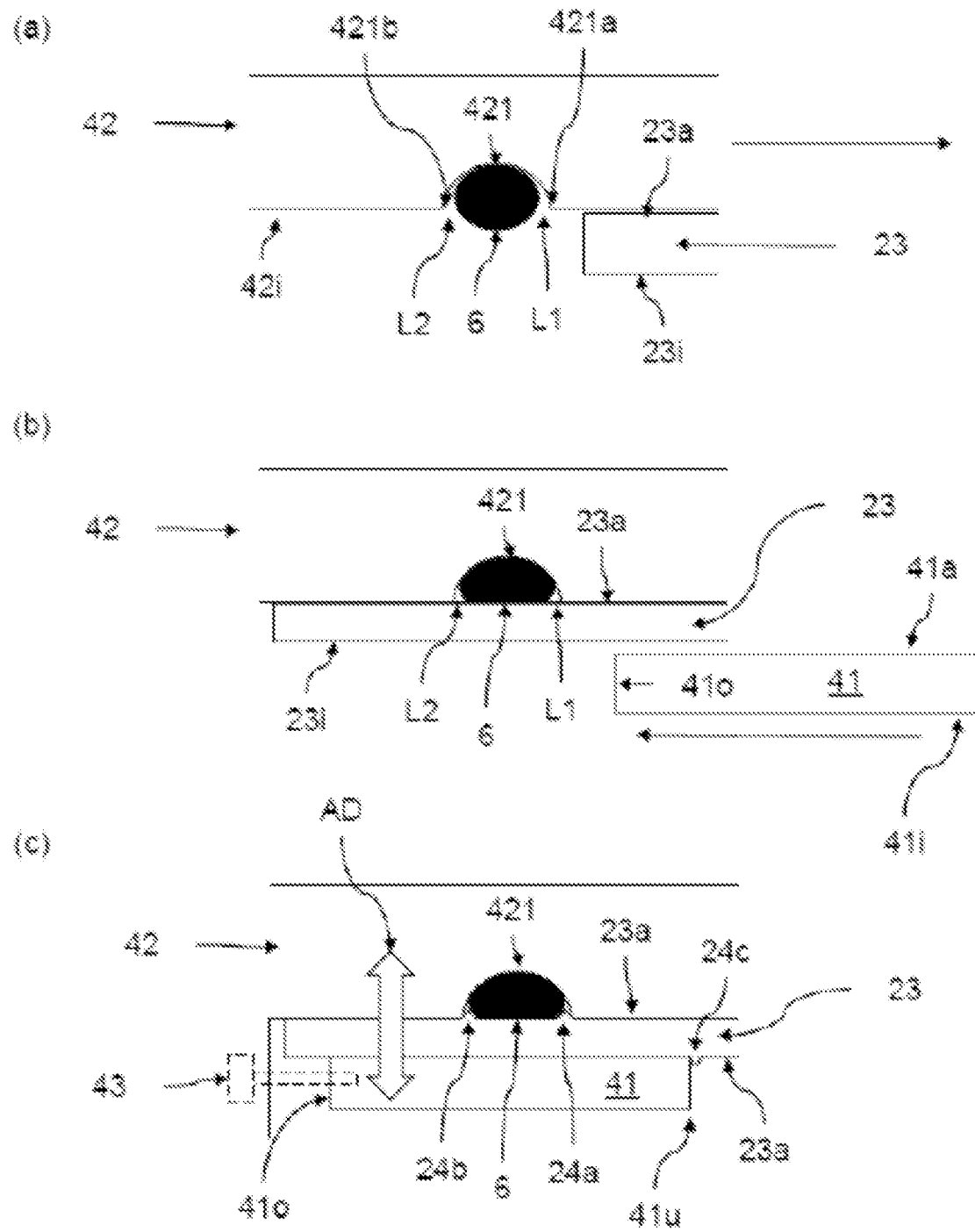
FIG. 2 is a schematic presentation of a sealing concept.

FIG. 2 is a schematic presentation of the sealing concept with counterpiece 42, connecting area 23 of the boss 2, squeezing ring 41 and the formed sealing beads 24a, 24b, 24c. In FIG. 2a, the inner face 42i of the counterpiece 42 is slid over the outer face 23a of the connecting area 23. The sealing ring 6, here embodied as an O-ring, is positioned in the groove 421, with gaps L1 and L2 being present with respect to the edges 421a and 421b, in which gaps there is no material of the O-ring 6. In addition, the groove 421 has a contour adapted to the shape of the O-ring 6 in the unloaded state, so that the ring is not twisted when the counterpiece 42 is slid on. After the counterpiece 42 has been slid over the connecting area 23, the O-ring 6 is compressed so that the gaps L1 and L2 are reduced but nevertheless still exist due to the dimensioning of the groove 421 and the O-ring 6. At this time, no sealing beads are formed yet because the sealing pressure AD necessary for this purpose is only produced after the squeezing ring 41 has been positioned on the connecting area 23 from the inside. As shown in FIG. 2*b*, the outer face 41*a* of the squeezing ring 41 is now slid from the inside onto the inner face 23*i* of the connecting area 23. These two steps (sliding on the counterpiece 42 and sliding in the squeezing ring 41) can also be performed in reverse order, with the result shown in FIG. 2*c* being the same. When the squeezing ring 41 has been placed in the proper position on the inner face 23*i* of the connecting area 23, the sealing pressure AD acts between squeezing ring 14, connecting area 23 and counterpiece 42. Due to the sealing pressure AD, with the groove 241 and the O-ring 6 dimensioned accordingly, now first and second sealing beads 24*a*, 24*b* protruding into the two gaps L1, L2 between O-ring 6 and first and second edge 421*a*, 421*b*, respectively, are formed due to the plastic deformability of the liner material, which beads form, together with the conventional seal (O-ring to connecting area), a seal with triple redundancy of the storage volume SV with respect to the outer face of the pressure vessel 1. Also, the squeezing ring 41 is dimensioned here such that the liner material, due to its plastic deformability, additionally forms a third bead 24*c* around the squeezing ring 41 on its bottom face 41*u* directed towards the storage volume SV. This third bead 24*c* supports the seal with triple redundancy insofar as the third bead 24*c* holds the squeezing ring in position and prevents it from sliding or falling into the liner. Additionally, in FIG. 2*c*, an embodiment is indicated (shown in dashed lines) in which the boss 4 comprises an additional safety element 43 interconnecting the squeezing ring 41 and the counterpiece 42. This safety element 43 is a screw retained in the counterpiece 42 the thread of which establishes a secure connection with a corresponding hole in the upper face 410 of the squeezing ring 41.

Figure 3:
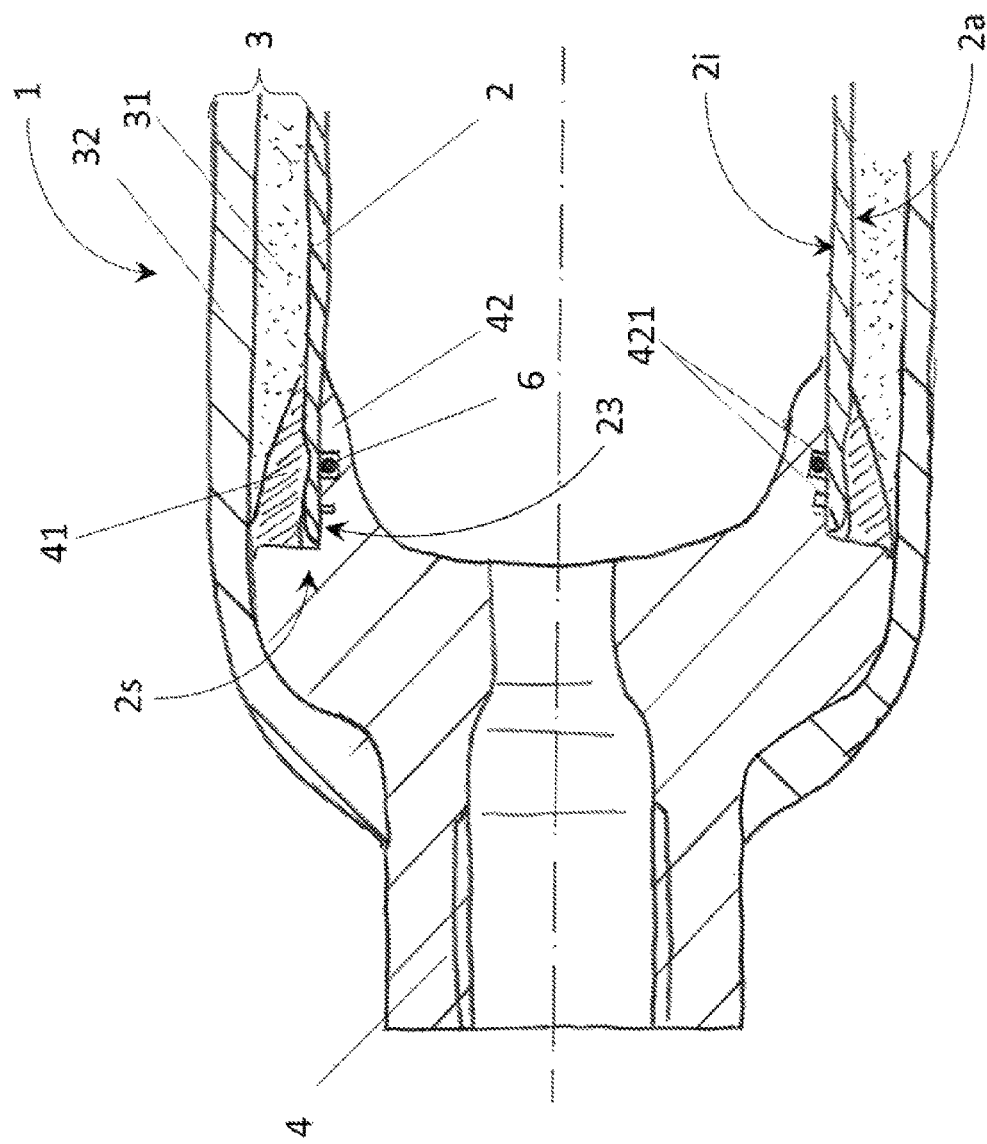
FIG. 3 shows a portion of another embodiment of the hybrid pressure vessel according to the invention in cross-section.

In FIG. 3, the situation from FIG. 1 is shown in a reverse arrangement; that is, the squeezing ring 41 is now positioned on the outside of the connecting area 23 of the liner 2 whereas the counterpiece 42 of the boss protrudes on the interior into the connecting area 23 of the liner 2. Accordingly, the description of FIG. 1 must be read vice versa.

Figure 4:
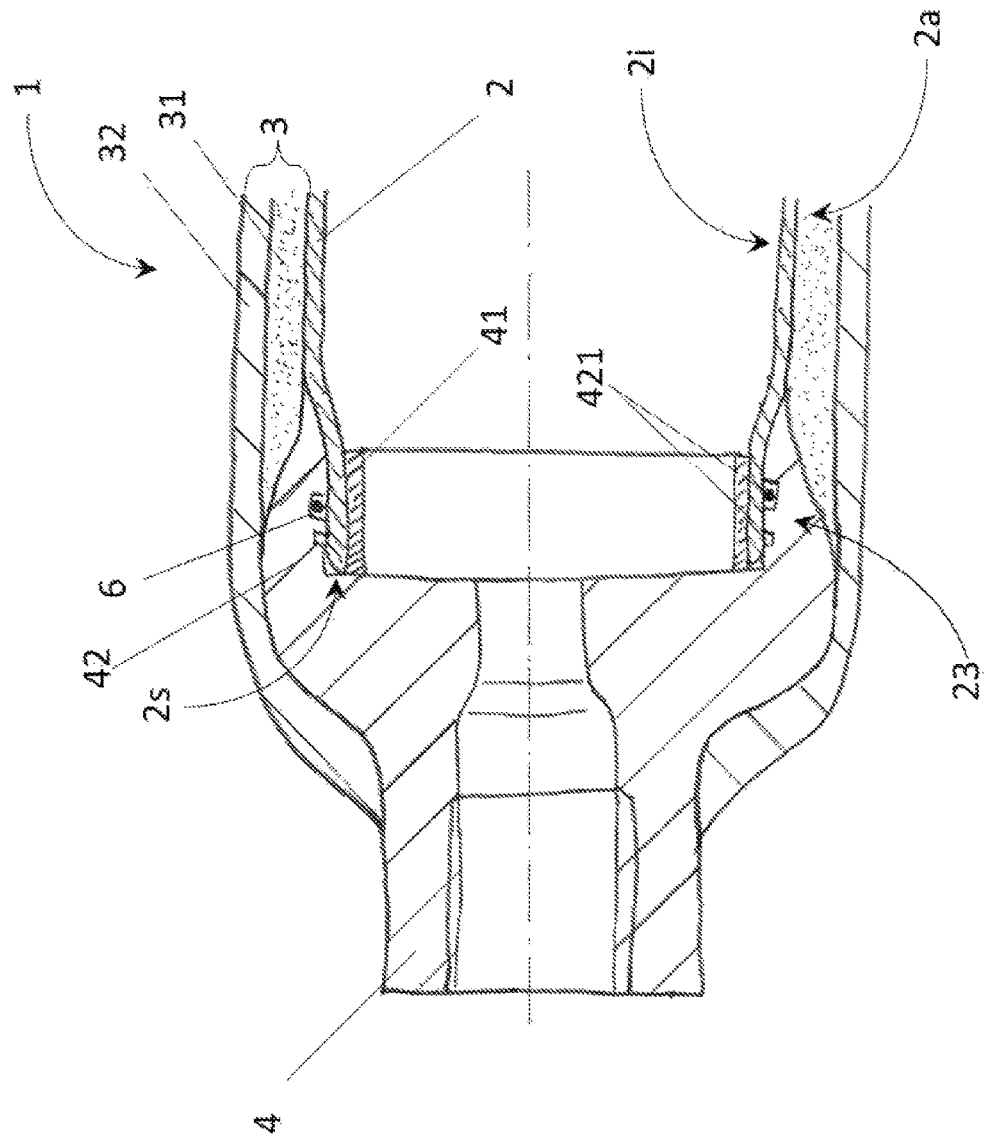
FIG. 4 shows a portion of another embodiment of the hybrid pressure vessel according to the invention in cross-section.

In FIG. 4, basically again the situation from FIG. 1 is shown, with the liner 2 being constricted in its connecting area 23. Constriction may take place, for instance, by a temperature effect, the constriction here being cylindrical. The constriction can result in a little more wall thickness in the outer area of the boss for accommodating the liner. The rest of the description of FIG. 1 also applies to FIG. 4.

LIST OF REFERENCE NUMBERS

1 hybrid pressure vessel
2 liner
2*i* inner face of the liner
2*a* outer face of the liner
2*s* end face of liner pipe
23 connecting area of liner
23*i* connecting area inner face of liner
23*a* connecting area outer face of liner
23*o* upper end of connecting area of liner
24*a* first sealing bead
24*b* second sealing bead
24*c* third bead
3 outer layer
31 inner ply of outer layer
32 outer ply of outer layer
4 boss
41 squeezing ring
41*a* first face of squeezing ring
41*i* second face of squeezing ring
41*o* upper end of squeezing ring
41*u* lower end of squeezing ring
42 counterpiece
42*i* inner face of counterpiece
421 groove
421*a* first edge
421*b* second edge
43 safety element
5 valve
6 sealing ring
AD sealing pressure
GV gas connection
L1, L2 gaps between first or second edge of the groove and the squeezing ring, respectively
SV storage volume

The invention claimed is:

1. A hybrid pressure vessel comprising:
a liner having a connecting area, an inner face, and an outer face, the liner having a pipe-shape and an outer diameter;
a metallic boss having an outer diameter at least as large as the outer diameter of the liner, the metallic boss being adapted to accommodate a valve;
a squeezing ring disposed inside the liner to expand the connecting area of the liner against a counterpiece of the metallic boss to form a seal between the liner and the counterpiece,
wherein the hybrid pressure vessel has a storage volume on the inside; and
wherein the liner is made of a material at least partially plastically deformable under pressure, the hybrid pressure vessel has further at least one outer layer applied on the liner to the reinforcement thereof, the squeezing ring and the counterpiece accommodating the valve and for sealing the storage volume with respect to the liner; the connecting area of the liner comprising an outer face and an inner face for connecting the boss; the squeezing ring being positioned on one face of the connecting area of the liner and the counterpiece for generating a sealing pressure between squeezing ring, connecting area of the liner and counterpiece on a different face of the connecting area of the liner; the counterpiece having on its face facing the connecting area of the liner a suitably formed groove with a first edge facing the storage volume and a second edge in the opposite direction for receiving a sealing ring which seals under the sealing pressure; the groove and the sealing ring being dimensioned and the liner material being provided to form first and second sealing beads protruding at least in both gaps between sealing ring and first and second edge under the sealing pressure due to its plastic deformability.

2. The hybrid pressure vessel according to claim 1, wherein the squeezing ring is positioned on the inner face of the connecting area of the liner and the counterpiece for generating a sealing pressure between squeezing ring, connecting area of the liner and counterpiece on the outer face of the connecting area of the liner.

3. The hybrid pressure vessel according to claim 1, wherein the squeezing ring is dimensioned such that the liner material, due to its plastic deformability, forms a third bead around the squeezing ring on its lower face directed towards the storage volume.

4. The hybrid pressure vessel according to claim 1, wherein the squeezing ring or the counterpiece is formed such that between the storage volume and an upper end of the connecting area of the liner, there is an open gas connection with the storage volume.

5. The hybrid pressure vessel according to claim 1, wherein the counterpiece has, on its face facing the connecting area of the liner, at least one additional suitably formed groove for absorbing axial forces.

\* \* \* \* \*